B. S. SUMMERS.
MECHANISM FOR TREATING THE STRAW OF FLAX AND THE LIKE.
APPLICATION FILED MAR. 11, 1908.
1,069,202.
Patented Aug. 5, 1913.
9 SHEETS—SHEET 1.
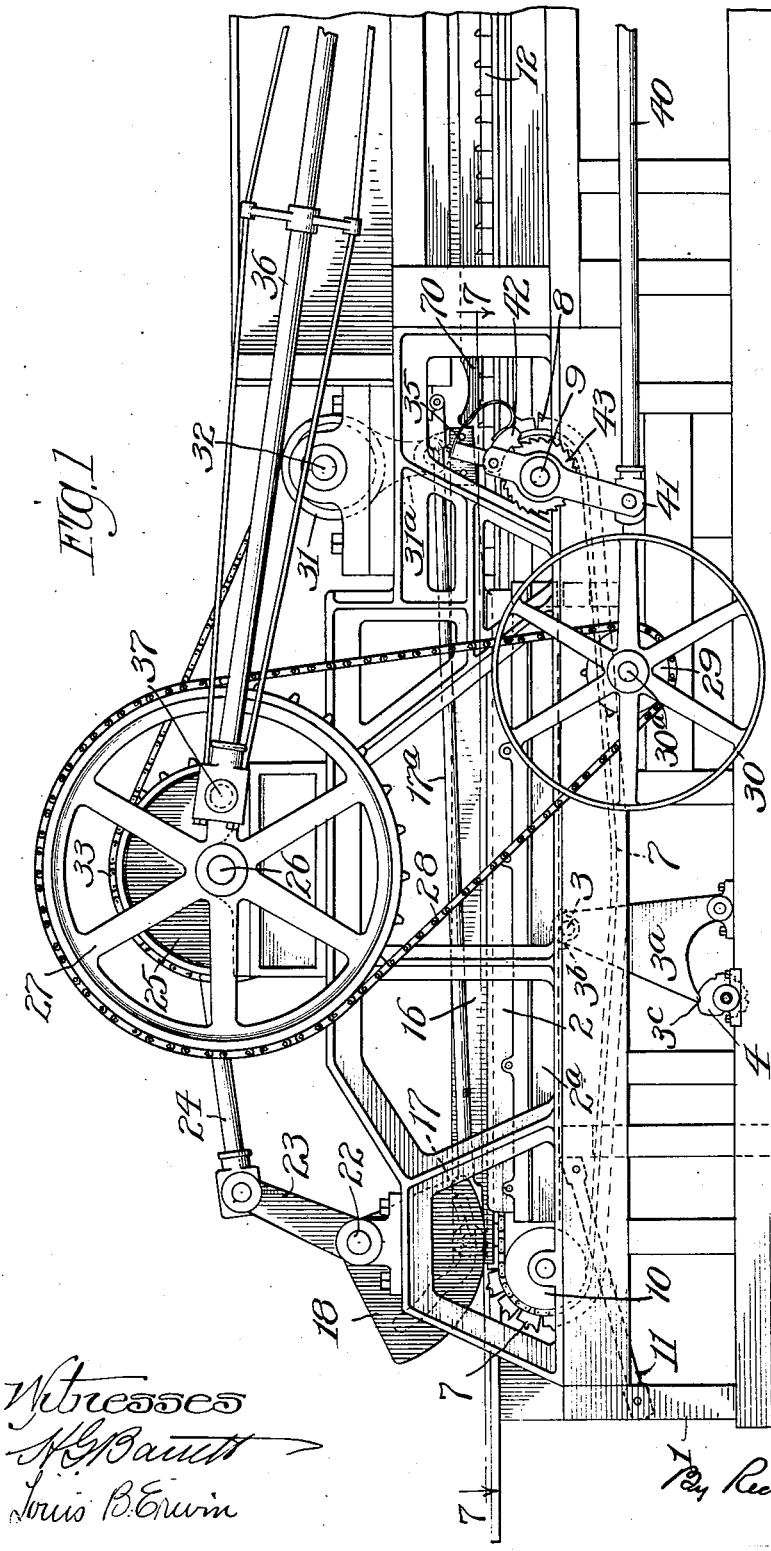
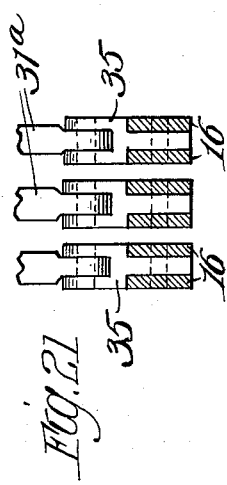
Witnesses
N. G. Barrett
Louis B. Erwin
Inventor:
B. S. Summers
By Rector, Kibben & Davis
His Attys.

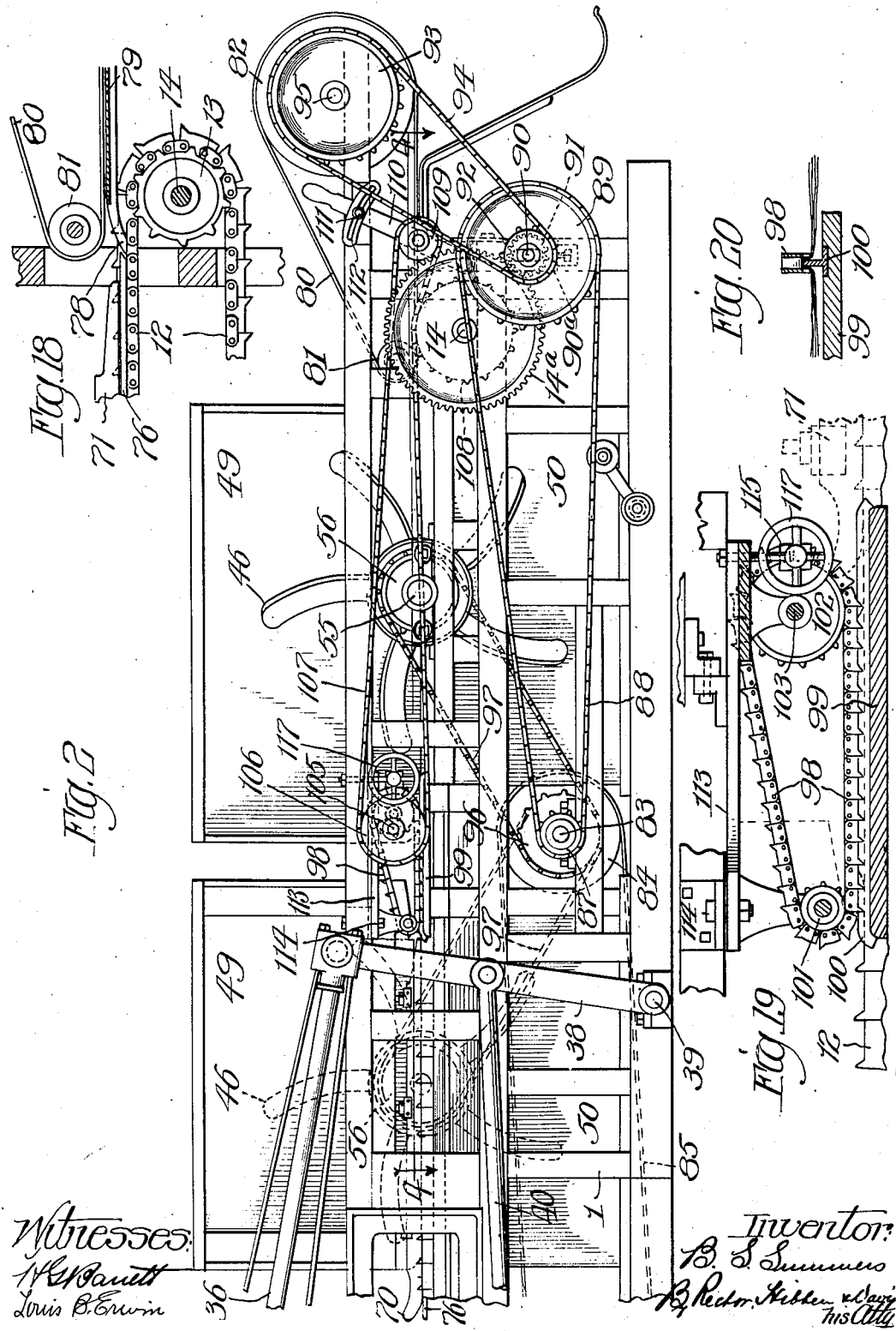

B. S. SUMMERS.
MECHANISM FOR TREATING THE STRAW OF FLAX AND THE LIKE.
APPLICATION FILED MAR. 11, 1908.
1,069,202.
Patented Aug. 5, 1913.
9 SHEETS—SHEET 3.
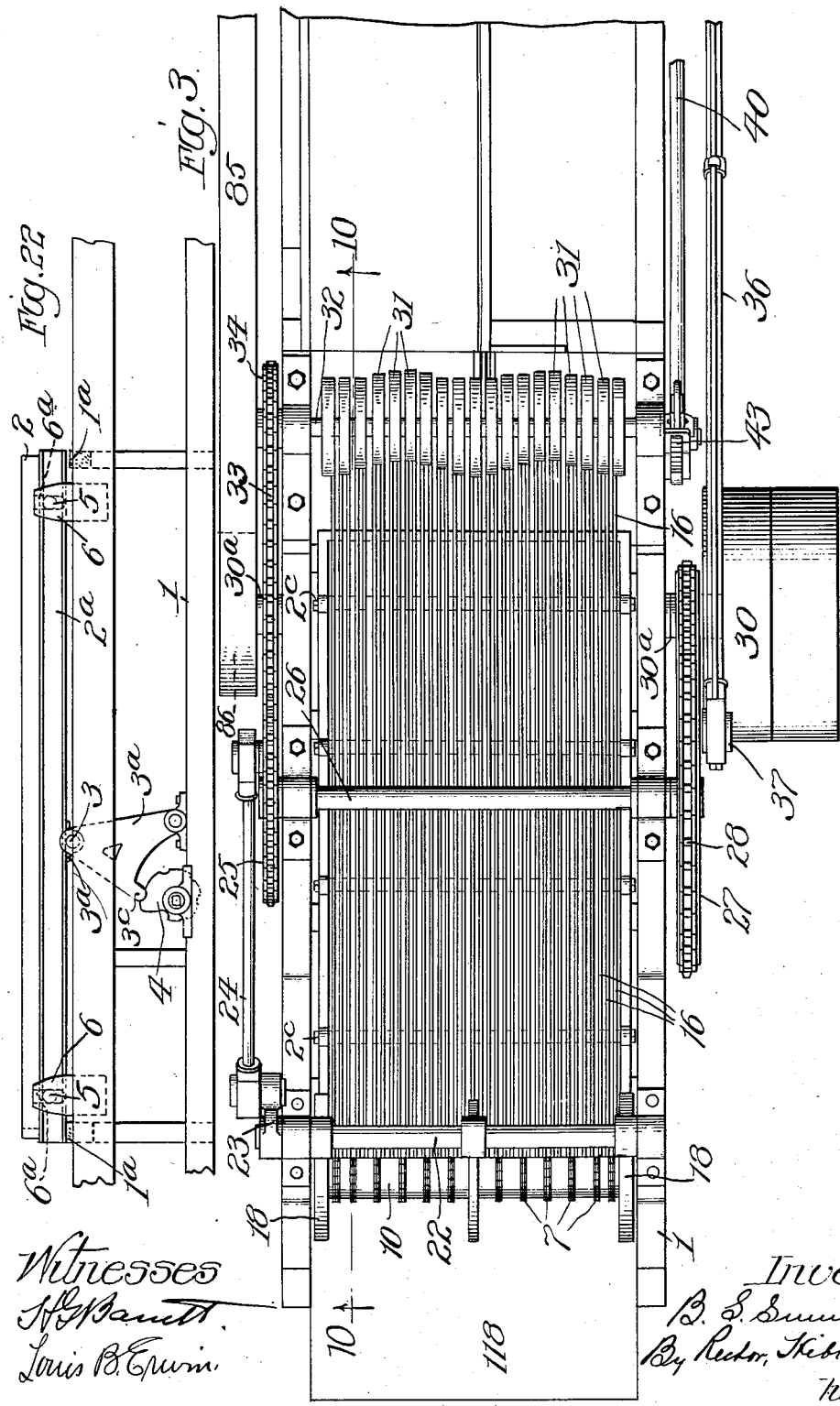

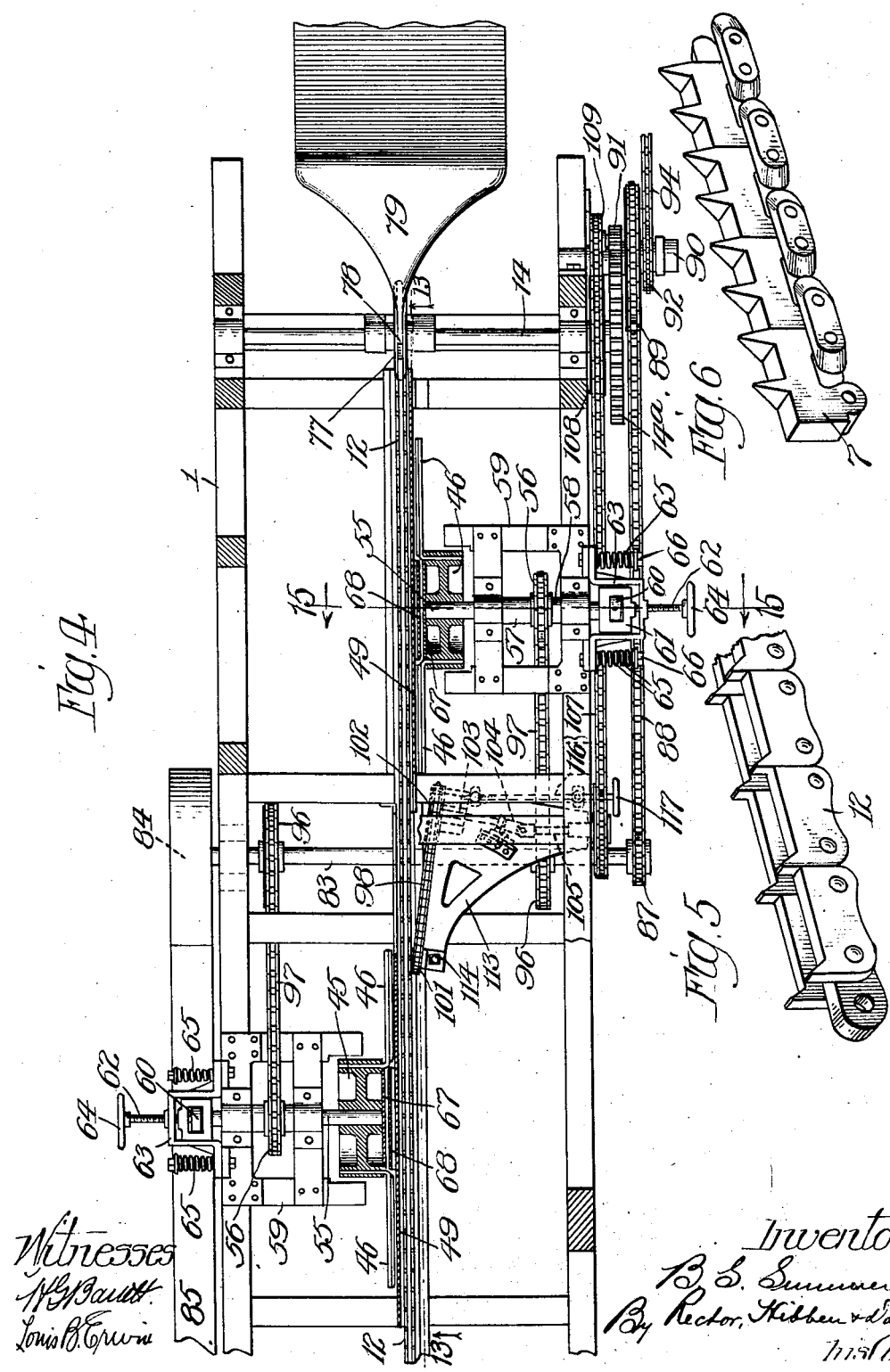

B. S. SUMMERS.
MECHANISM FOR TREATING THE STRAW OF FLAX AND THE LIKE.
APPLICATION FILED MAR. 11, 1908.
1,069,202.
Patented Aug. 5, 1913.
9 SHEETS—SHEET 5.
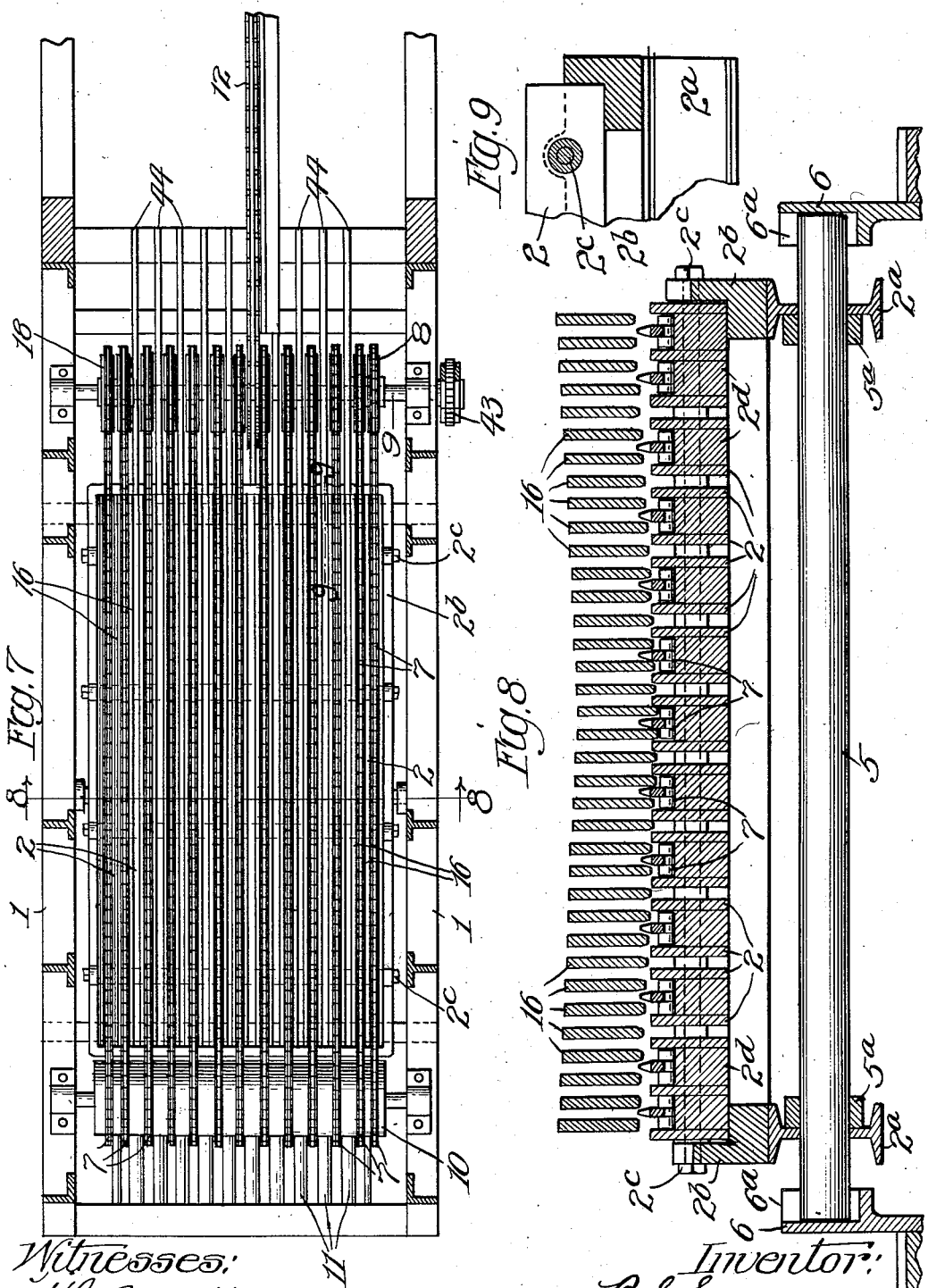

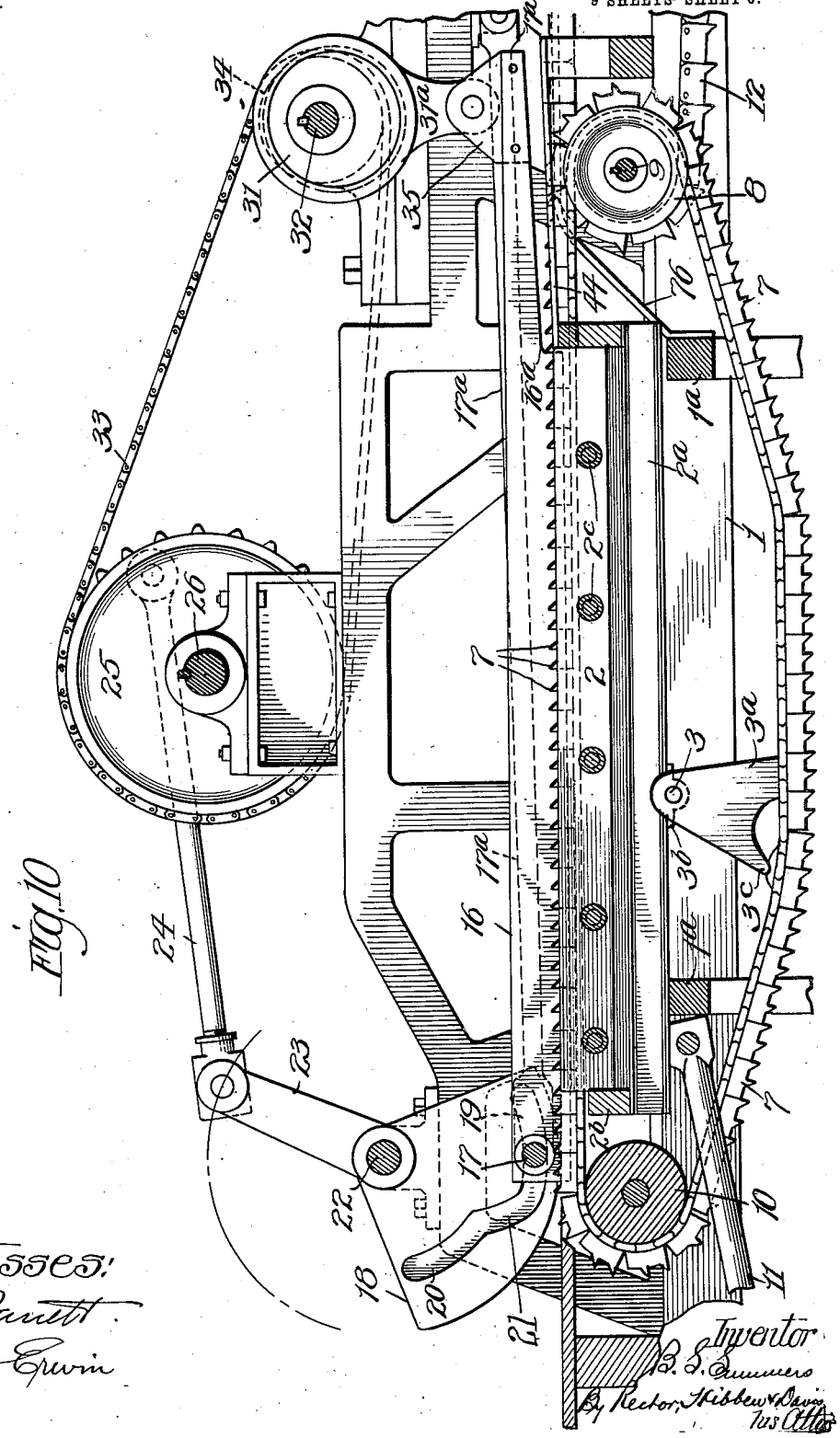

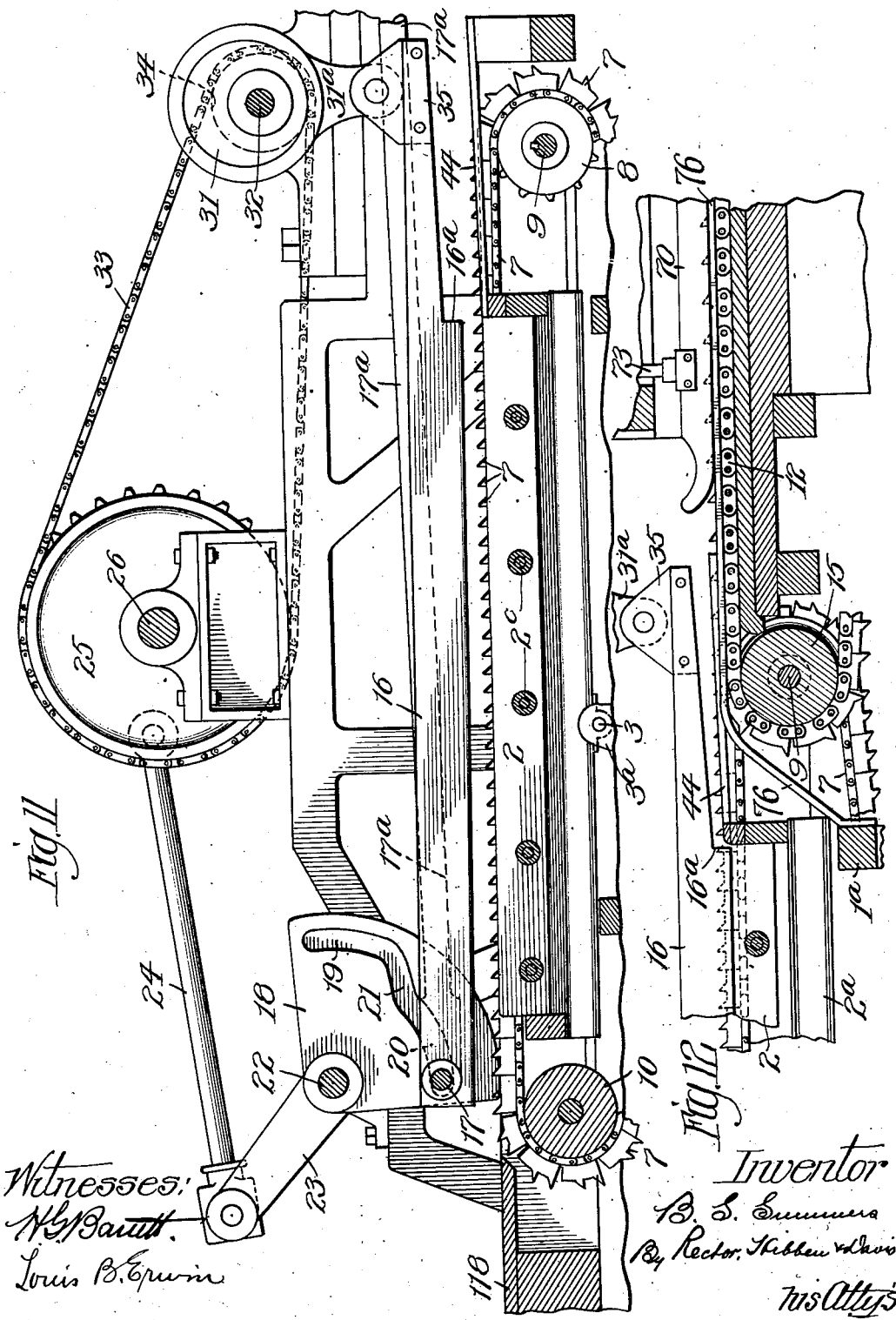

B. S. SUMMERS.
MECHANISM FOR TREATING THE STRAW OF FLAX AND THE LIKE.
APPLICATION FILED MAR. 11, 1908.
1,069,202.
Patented Aug. 5, 1913.
9 SHEETS—SHEET 8.
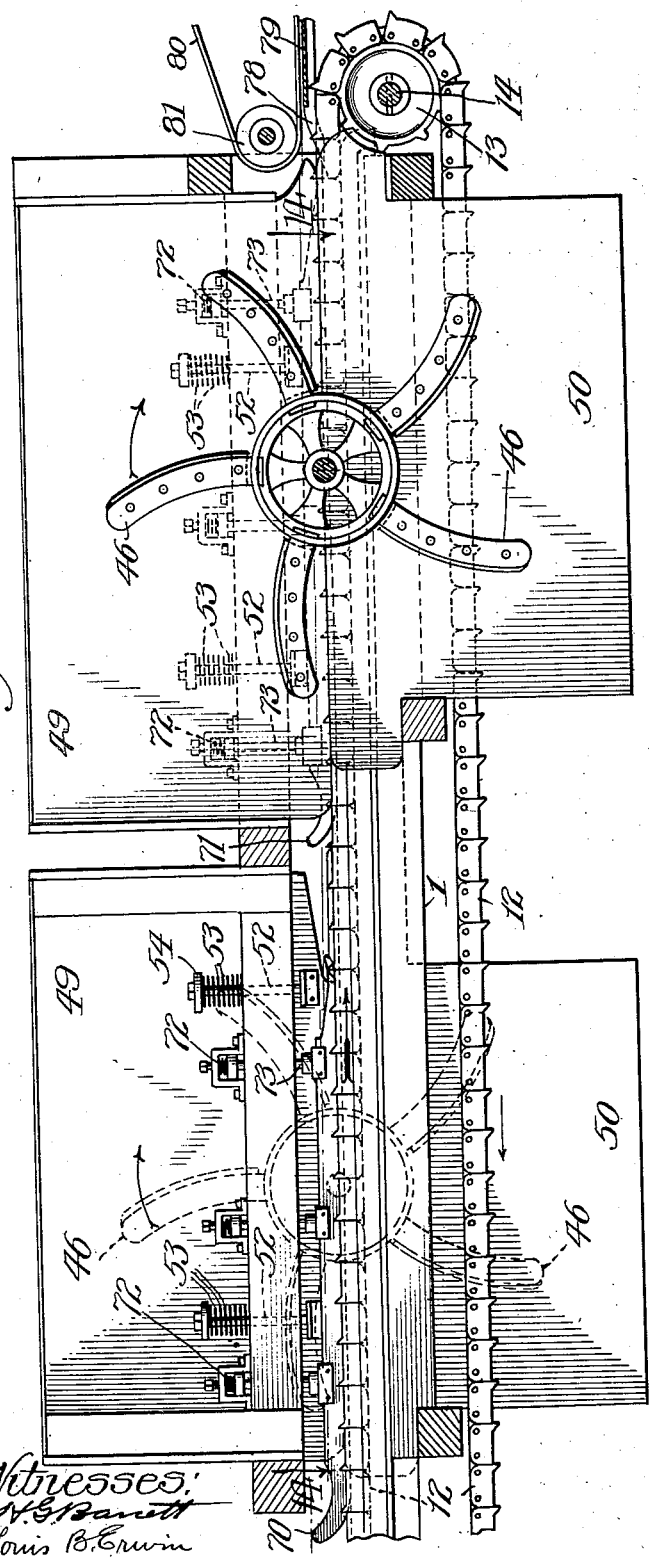
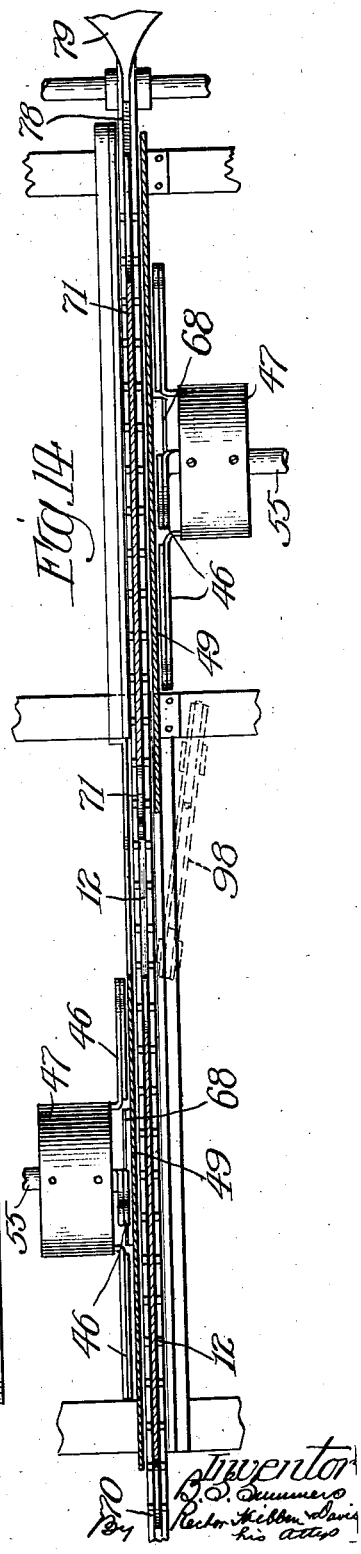

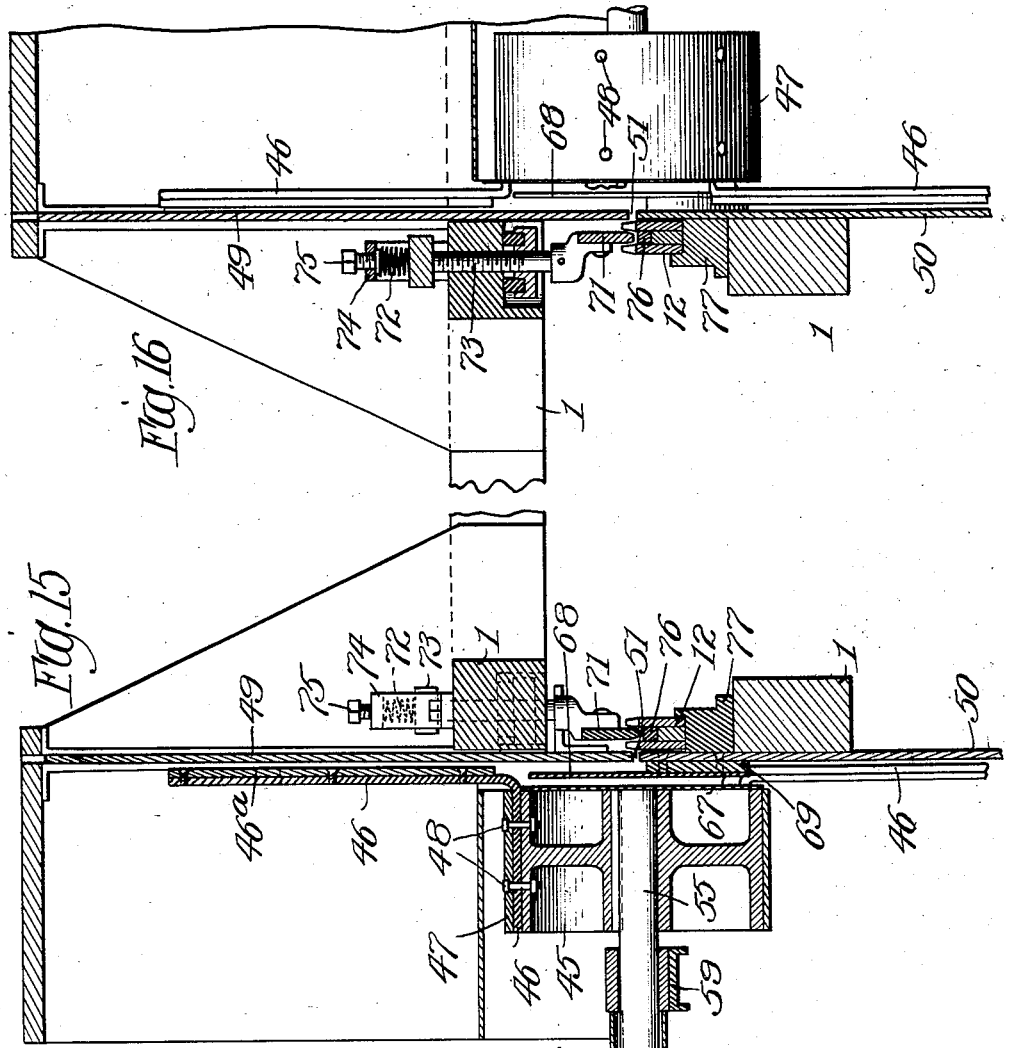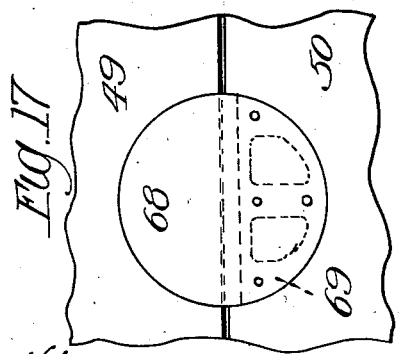

UNITED STATES PATENT OFFICE.

BERTRAND S. SUMMERS, OF PORT HURON, MICHIGAN, ASSIGNOR TO SUMMERS LINEN COMPANY, A CORPORATION OF MAINE.

MECHANISM FOR TREATING THE STRAW OF FLAX AND THE LIKE.

1,069,202.  Specification of Letters Patent.  Patented Aug. 5, 1913.

Application filed March 11, 1908. Serial No. 420,431.

*To all whom it may concern:*

Be it known that I, BERTRAND S. SUMMERS, a citizen of the United States, residing at Port Huron, in the county of St. Clair and State of Michigan, have invented a certain new and useful Mechanism for Treating the Straw of Flax and the Like, of which the following is a specification.

My invention relates to the art of treating the straw of flax and the like for the production of fiber and the object thereof is to provide a simple, reliable and efficient machine for accomplishing this result in a continuous, expeditious and satisfactory manner. To this end I provide a machine having a novel construction and mode of operation, for breaking the straw throughout its length, thereby breaking or crackling the wood or pith thereof, and then for scutching or beating the straw to free the fiber from such wood or pith, the operation being automatic and continuous from the feeding of the straw at one end of the machine to its delivery as cleaned fiber at the other end thereof. In the present instance the mechanism for breaking the straw comprises a breaking surface in the form of a grid and a series of breaking blades or bars capable of imparting repeated and successive impacts or blows upon the straw from the middle outwardly, with the result that portions of the straw are forced by such blades into the spaces of the grid and thereby sharply bent or crimped, said successive action so imposed upon the straw from the middle outwardly to the ends providing the required slack to form the bends or crimps by the free inward longitudinal motion of that portion of the straw not yet acted upon by the breaking bars, so that the wood or pith is broken without breaking or affecting the strength of the fiber itself in any manner. The beating or scutching mechanism comprises a pair of scutching wheels adapted in coöperation with scutching boards to thoroughly beat and clean the material or hank on both sides or in both directions, first beating the same downwardly as it approaches the center of the wheel and then upwardly as it recedes therefrom, with the result that the wood and pith loosened in the breaking operation and not removed at that point are effectually removed, leaving the fibers intact and clean.

My machine is automatic in its opera-
tion, from the feeding of the straw at one end of the machine to the delivery thereof at the opposite end, such result being accomplished by mechanism for conveying the straw through the machine and past the agencies or operating devices described and also by mechanism for conveying and delivering the finished or cleaned fiber from the machine.

My machine employs as an additional feature novel and efficient mechanism for conveying the straw lengthwise, that is obliquely of the length of the machine, at a point in its travel between the beater, so that the straw may be efficiently beaten throughout its entire length, that portion of the straw which was held or clamped when acted upon by the first beater being thereupon made subject to the action of the second beater, and consequently properly beaten and cleaned.

My invention embodies other novel and advantageous features of construction and mode of operation which will be apparent from the description hereinafter given.

In the drawings, Figure 1 is a side elevation of one end of the machine, the same being the receiving or feed end containing particularly the mechanism for breaking or crackling the straw; Fig. 2 is a side elevation of the remainder of the machine containing particularly the pair of beaters and mechanism for delivering the finished or cleaned fiber from the machine, this figure being intended as a continuation of the front end of the machine shown in Fig. 1, so that when the two figures are placed end to end the entire machine is illustrated in side elevation; Fig. 3 is a plan view of the front or feed end of the machine which is illustrated in Fig. 1; Fig. 4 is a sectional plan of the rear end of the machine, the section being taken on the line 4—4 of Fig. 2; Fig. 5 a perspective view of a portion of the scutching chain which serves to feed the straw through the scutching machine; Fig. 6 a perspective view of a portion of one of the series of feed chains for feeding the straw transversely across the grid of the breaking mechanism; Fig. 7 a sectional plan on the line 7—7 of Fig. 1, and illustrating the grid, break chains, etc.; Fig. 8 a cross section on the line 8—8 of Fig. 7 but made on a somewhat larger scale; Fig. 9 a detail view consisting of a section taken on the line 9—9 of Fig. 7; Fig. 10 is an enlarged sectional elevation on line 10 of Fig. 3; Fig. 11 is a view similar to Fig. 10 but illustrating the breaking blades in their elevated position; Fig. 12 is a detail view of the rear end of the chains for conveying the material through the brake and front end of the scutching chain showing manner of delivery of the straw from one to the other; Fig. 13 a central vertical section taken on the line 13—13 of Fig. 4 and illustrating the scutching devices and the scutching chain; Fig. 14 a sectional plan, the section being taken on the line 14—14 of Fig. 13; Fig. 15 an enlarged vertical section taken on line 15—15 of Fig. 4 illustrating the scutching devices and the manner of holding or clamping the straw while being acted upon by the beater and also illustrating the means for adjusting the scutching wheel; Fig. 16 a similar view illustrating the other scutching board and beater; Fig. 17 a detail view of the shield arranged on the scutching board illustrated in Figs. 15 and 16; Fig. 18 a detail view showing the manner of delivery of the fiber to the delivery mechanism; Fig. 19 a detail view of the obliquely trending conveyer; Fig. 20 a detail view of its platform and clamping rib; Fig. 21 a detail view showing the manner of connection of the eccentric straps with the breaking blades; and Fig. 22 a detail view of the means for adjusting or regulating the height of the grid and for permitting the rocking of the same.

Referring to the embodiment of my machine as herein shown, the same includes, in the order here named beginning at the left hand or feed end of the machine illustrated in Fig. 1, the conveying mechanism which receives the straw at the extreme left hand end of the machine, the breaking mechanism which breaks the straw which is fed upon and across it by said conveying mechanism, the first clamping mechanism for clamping the straw substantially at its middle and clamping it to the conveying mechanism or chain which carries it through the machine, the first beater which beats one end or substantially one half of the straw, the obliquely trending conveyer for moving the straw slightly longitudinally of its length, that is laterally of the machine at a gap between the two beaters, the second clamping device for clamping the straw at one side of its middle portion, the second beater for beating the other end of the straw, that is the end not acted upon by the first beater, and finally the mechanism for delivering the finished or cleaned fiber from the machine, such latter mechanism being at the extreme right hand or delivery end of the machine as illustrated in Fig. 2.

The machine comprises a suitable frame indicated generally by 1 and of suitable size and length to accommodate or support the different mechanisms now to be described. Near the left hand or feed end (Fig. 1) is arranged the breaking device or surface for breaking or crackling the straw, the same consisting, as shown, of a grid, with which coöperates a series of breaking blades or bars hereinafter more particularly described. As shown more clearly in Figs. 7 and 8, the grid consists of a series of parallel bars 2 forming parallel spaces or interstices into which the movable breaking blades are depressed and into which they press the straw. While other forms of breaking surfaces may be employed, I prefer the form described, inasmuch as, being open from top to bottom, the same permits the woody particles and chaff of the straw to fall therethrough and to thereby clear themselves from the fiber which is to be passed farther through the machine. This grid, which, by preference, has a rocking or oscillating movement, is mounted upon and secured to the opposite sides of the machine frame. As shown more particularly in Fig. 8, the grid has a lower frame $2^a$ which, by preference, is of I beam construction and an upper rectangular frame $2^b$ in which the grid bars 2 are arranged in parallel relationship and connected together and positioned by means of cross bolts $2^c$ $2^c$. These grid bars may be made of any suitable material and while metal may be employed, yet I have found in practice that wooden bars are more suitable and efficient, inasmuch as there is less possibility of any tearing action on the fibers of the straw. The entire grid structure is arranged to rock and accordingly the frame $2^a$ while adapted to be supported at its ends alternately on the stationary cross pieces $1^a$ of the machine frame is carried by and mounted to rock upon a cross shaft 3 which passes through the triangular supports or plates $3^a$ at opposite sides of the grid frame and is journaled in the boxes $3^b$ mounted loosely (to permit of a sliding movement) to the lower flanges of the two parallel longitudinal I beams on one side of the middle of the grid and toward the front (Figs. 1, 10 and 22). These plates are also pivoted at their lower ends upon the machine frame and provided with fingers or extensions $3^c$ adapted to coöperate with notches on the edges of cam plates 4. Each cam plate is mounted in bearings on the main frame and provided with a square end shaft whereby the same may be oscillated by a key wrench or the like. It will be apparent that the height of the grid is determined by the particular notches of the cam plates engaged by said finger. The purpose of the rocking of the grid will be explained when the operation of the machine is described. Near each end of the I beam frame of the grid is a shaft 5 passing therethrough and provided with collars 5ª to prevent the shaft from moving sidewise. The ends of these shafts project into the slots 6ª of plates or castings 6, which slots extend vertically a sufficient distance and are a trifle wider than the shaft diameter (Figs. 8 and 22). By this arrangement the shafts are permitted to move in the rocking action of the grid and are moreover guided in said movements.

For conveying or feeding the straw across and longitudinally of the machine with an intermittent movement, I provide a series of brake feed chains 7 which are preferably of the number and in the relationship in the grid as illustrated in Fig. 8, in which these chains are shown as also acting as breaking bars in the same manner as the regular bars of the grid. To this end, at the points where the feed chains travel the regular grid bars are omitted and strips 2ᵈ are inserted for the chain to run upon. These feed chains are of such a size and are so positioned that the top of their links will be level with the upper edges of the regular grid bars, the teeth of such links of course projecting thereabove for the purpose of feeding the straw, Fig. 8. As a result of this construction and arrangement, it is evident that these feed chains represent breaking bars and thereby serve the double function of feeding the straw and breaking or crackling the same in coöperation with the breaking blades. These feed chains, which are driven intermittently, extend over a series of sprocket wheels 8 mounted upon a driving shaft 9, Figs. 1, 7, 10 and 11, which is operated intermittently and in the manner and by the means hereinafter explained. At their other ends, these feed chains by preference extend around a common idler or cylinder 10, as shown in Figs. 7 and 10, the chains being properly spaced thereon in suitable manner, as by means of the series of rods 11, projecting from a fixed portion of the main frame. The feed chains are adapted to feed the straw in a direction longitudinal of the machine and from end to end of the grid and somewhat therebeyond until the same deliver the straw to a feed chain extending longitudinally of the machine and hereinafter referred to as the scutcher chain, which feeds the straw past the beaters and delivers it to the delivery mechanism at the other end of the machine. This scutcher chain 12, which is illustrated in detail in Fig. 5, extends over a sprocket wheel 13 at the delivery end of the machine and is driven thereby, Figs. 13 and 18. This sprocket wheel is mounted upon a cross shaft 14 which is itself driven continuously by the connections hereinafter described. At its forward end this scutcher chain extends over an idler pulley 15, which is loosely mounted upon the cross shaft 9, Fig. 12.

The breaking blades which coöperate with the grid in the operation of breaking or rather crimping the straw, thereby crackling and loosening the wood thereof, are represented by the series of blades 16, riveted together in pairs with suitable spaces between and equaling in number the spaces or interstices between the grid bars, including the chains hereinbefore referred to as serving as grid bars, Fig. 8. As the straw is fed over the grid by these feed chains, the breaking blades are operated at the proper time and forced downwardly in said interstices of the grid, thereby striking and thrusting the straw therein and crimping the same with the results already specified. These breaking blades are not operated or depressed simultaneously, but the construction and arrangement of the operating mechanism therefor is such that the blades at the center are first depressed and then the remainder are depressed successively, the action being progressively from the center outwardly to the opposite sides, with the result that in the crimping of the straw sufficient slack is provided in order to make the crimps without breaking, tearing or straining the fiber of the straw. These breaking blades move repeatedly and rapidly and thereby impart rapid and successive impacts or blows upon the straw so conveyed unto the grid. For the purpose of operating these breaking blades in the peculiar manner just described, such blades are provided at one end (in the present instance the front or feed end) with a raising and lowering device and at the other or delivery end with a raising and depressing device. As shown in Figs. 1, 10 and 11, the front ends of the blades are connected to a cross rod or shaft 17 which passes through them near their ends and which serves as a fulcrum therefor. This shaft and consequently the fulcrum is adapted to be raised and lowered, the same forming a part of the raising and lowering device above referred to. To thus change the position of this shaft or fulcrum I provide a pair of cam plates 18, which are adapted to oscillate in time with the conveyer mechanism. These cam plates are provided with cam slots receiving the opposite ends of the shaft or fulcrum 17 and comprising two locking portions 19 and 20 which are concentric with the axis of the cam plates and with an active portion 21. It will be understood that when the cam plates are swung to the position illustrated in Figs. 1 and 10, the front ends of the breaking blades are in their lowermost position, inasmuch as their fulcrum occupies a position in the locking portion 19 of the cam slot which, though inactive as to vertical movement, yet holds the fulcrum in stationary position. When, however, the cam plates are oscillated in an anti-clockwise direction, the inclined portion 21 of the cam slot will raise the fulcrum 17 and such fulcrum will be held in its elevated position by the portion 20 of the cam slot. These cam plates may be operated in any suitable manner, but in the present instance they are operated by the following driving connections: The cam plates are secured at their upper ends to a rock shaft 22 extending transversely of the machine and having bearings thereon at its ends. At one end of this shaft is secured a crank arm 23 pivotally connected at its outer end with a connecting rod 24 which in turn is pivotally connected to the large driving wheel 25, with the result that as such wheel is rotated the cam plates 18 are oscillated as described. As shown, this wheel 25 is secured to one end of the shaft 26, to whose other end is secured a large sprocket wheel 27, which is driven through the medium of the sprocket chain 28 and sprocket wheel 29 by the driving or power pulley 30, connected with the latter. It will be understood that the movement of these driving connections is continuous, but the raising and lowering of the fulcrum 17 of the breaking blades is intermittent, inasmuch as the portions 19 and 20 of the cam plates are of such length as to hold such fulcrum the required length of time in both its raised and lowered positions. Moreover, the movements of the fulcrum as thus caused by the cam plates, is so timed that the fulcrum is raised during the time that the intermittently operating conveyer chains are in motion, so that the straw will be fed forward freely and without interference from the breaking blades. In order to maintain the fulcrum shaft 17 in proper position and prevent endwise movement thereof, I provide distance rods 17ª the forward ends of which are pivoted to said shaft and the rearward ends of which are pivoted to the machine frame (Figs. 1, 10 and 11).

Referring next to the so called raising and depressing device at the other or delivery end of the breaking blades, the same comprises a series of eccentrics operatively connected with such blades for the purpose of raising and depressing the blades into the spaces or interstices between the bars of the grid. As shown, particularly in Figs. 3 and 10, the eccentrics 31 are secured to a cross shaft 32 journaled on the machine frame and rotated by the large driving wheel 25, through the medium of the sprocket chain 33 and sprocket wheel 34. Each of these eccentrics has a strap 31ª pivotally connected at its lower end to a pair of the breaking blades through the medium of a plate 35, as shown in detail in Figs. 11 and 21. The series of eccentrics 31 are differently timed and for this purpose the same are secured to their driving shaft 32 in different relative positions, as clearly illustrated in Fig. 3, with the result that in operation the eccentric at the center will operate first of all followed by the successive operations of the eccentrics on its opposite sides, a corresponding order of depression resulting in the driving or depressing of the breaking blades into the grid. It is evident that when any one of the eccentrics is in the position as illustrated in Fig. 10 the pair of breaking blades to which it is connected will be in its depressed position and that when the eccentric is moved a half revolution, such blades will be in their raised position.

As illustrated more clearly in Fig. 10, each of the breaking blades is a flat strip of suitable material, such as metal and rectangular in shape, except as to the rear or delivery end, where the under edge of the same is cut away on a bias beginning at the point 16ª just inside the rear end of the grid. At this point, a restriction or throat is formed. The inclined or cut-away portions at the rear ends of these breaking blades permit the free expansion and movement of the straw after it has passed through the restricted passage or throat just described. This restricted passage or throat arises from the fact that the opening of the breaking device for the free passage of the fiber, when the conveyer chains move, is provided by the raising and lowering device and the motion of this device must be sufficient to permit the fiber to move freely at this point whether the eccentrics are in their lowest position or not. In view of the functions performed by the different operating mechanisms at the opposite ends of the breaking blades, I term the mechanism or device at the front or feed end of the blades a raising and lowering device, inasmuch as it raises the pivoted end of the blade simultaneously, and lowers them simultaneously. The operating mechanism at the other end of the blades, I term the raising and depressing device, inasmuch as the same raises and lowers the blades separately and at different times and also depresses them into the breaking surface or grid.

As hereinbefore stated, the break chains are operated intermittently in proper time with the movements of the breaking blades while the scutching chain is operated continuously. In the present instance, this intermittent movement of the conveyer chains is accomplished through the medium of driving connections with the large sprocket wheel 27. As shown in Figs. 1 and 2, a connecting rod 36 is pivotally connected at its front end to a wrist pin 37, on said wheel and at its other end with the upper end of a rock arm 38 which is fulcrumed at its lower end at 39. From a point intermediate of this rock arm 38 extends forwardly a connecting rod 40 which is pivotally connected at its front end to an arm 41 which is itself pivoted on the cross shaft 9, to which the series of sprocket wheels 8 of the conveyer chains are mounted. This arm 41 carries a spring-pressed pawl 42 which coöperates with a ratchet wheel 43 secured to said shaft 9, with the result that as the driving wheel 27 is rotated and the connecting rods are reciprocated, the ratchet wheel is advanced and the break chains correspondingly advanced in the operation of feeding the straw longitudinally of the grid.

The break chains are adapted to convey the straw across the grid longitudinally thereof and to deliver the same after being broken and crackled on the grid to the scutching chain, which carries it through the remainder of the machine in position to be acted upon by the scutching devices. In order to properly and effectually deliver the straw or fiber from the break chains to the scutching chains, I provide at a point in the rear of the grid and adjacent the series of sprocket chains 8, a series of strips or stripping fingers 44, Figs. 7 and 10, which are inclined upwardly from the rear end of the grid and extend to a point beyond or in the rear of said sprocket wheels, so that the straw being carried upon the break chains will be stripped therefrom by these fingers and will thereupon be delivered at a somewhat higher plane to the scutching chain, which will thereupon engage the same and carry it rearwardly through the machine.

Referring next to the mechanism for scutching or beating the straw, I provide the machine with two beaters or scutching wheels rotating in separate planes extending longitudinally of the machine and adapted to operate separately upon the straw which is fed through the machine and to the beaters and from one beater to the other by means of the scutcher chain before referred to. In the present embodiment of my invention, each scutching wheel comprises a drum 45 to whose periphery is attached a series of beater arms 46, Figs. 4, 13, 14, 15 and 16. The beater portions of these arms may be an integral structure of any suitable material or, if desired, may be of metal provided with a facing 46ª of a suitable material such as wood, Figs. 15 and 16. These beater portions rotate in a vertical plane while the inner portions thereof are bent at right angles and secured to recesses in the periphery of said drum. In practice, I prefer to surround said drum and said inner ends of the beater arm with a band 47, the parts being held together by means of bolts 48, Fig. 15. These beater arms are adapted to rotate in close proximity to a scutching board arranged in a vertical plane and comprising an upper portion 49 and a lower portion 50, said portions being slightly separated to form a slot 51, Figs. 15 and 16, along a line corresponding to the line of travel of the hank of straw or fiber through the machine. By preference the upper portion 49 of the scutching board is held in normal position with a yielding pressure and to this end such board is supported in position by means of brackets or rods 52 which pass loosely through a portion of the main frame 1 and are normally held upwardly with a yielding pressure by means of coiled springs 53, which bear respectively against the main frame and against collars 54 at the ends of the rods, as clearly illustrated in Fig. 13. By reason of the yielding mounting of the upper portion of such board it is held in close proximity to the lower section of the board whereby the opening between the two is kept as narrow as possible and at the same time it yields to prevent choking in case the straw is unduly crowded between the sections of the board.

Each scutching wheel is adapted to be adjusted toward and away from its scutching board. Referring to the construction as shown herein in Figs. 4 and 15, the drum of the scutching wheel is secured to a shaft 55, on which is splined a driving wheel 56, maintained in a fixed position relative to the longitudinal axis of the shaft by means of the two distance sleeves 57 and 58 arranged on either side thereof and encircling said shaft. This shaft 55 has its bearings in a supplemental frame 59 on the main frame and its outer or free end projects therebeyond and is provided with a collar 60 fixed thereto. This collar is engaged by and arranged to rotate in a block 61 which is adjustable in line with the longitudinal axis of the shaft 55. To this casing is secured an adjusting screw 62, screwing through a bracket 63 and provided at its end with a hand wheel 64. This bracket is held pressed toward the supplemental frame with a yielding pressure by means of the coiled springs 65 exerting their tension outwardly against the ends of bolts 66 secured to said supplemental frame with the result that the beaters are adapted to yield outwardly. It will be understood that when the hand wheel 64 is moved in one direction or the other the entire shaft 55 and its scutching wheel is adjusted toward or away from its scutching board.

Each scutching wheel is provided with a shield 67 consisting of a flat disk covering the inner face of the drum 45 and preventing the entrance thereinto of the straw or fiber. There is also provided in the present instance between each scutching wheel and its board a second or outer shield 68, which is also a disk and which forms above the slot 51 a restricted space between itself and the scutching board in the neutral zone of the scutching wheel, with the result that as the straw or fiber passing therethrough, after being acted upon in one direction by the beater arms at one side of the wheel and before being acted upon by the beater arms at the other side of the wheels, is prevented from twisting or roping, and thereby held in proper straight condition for action by the other set of beater arms. As shown, this outer shield is spaced the proper distance from the scutching board by means of the plate 69, said plate and outer shield being secured to the lower portion of the scutching board in suitable manner. This outer shield, however, is not essential.

The object of the scutching board which is provided for each beater or scutching wheel is to hold the material, that is the straw or its hank, in proper position while being struck and scutched by the arms of the beater, such board serving to keep the material within the range, that is, within the path of rotation, of the beater arms. Inasmuch as the scutching board extends across the entire face of its beater or scutching wheel and in fact extends therebeyond, two beating zones are formed, one located below the plane of the scutching chain or the axis of rotation of the beater, and the other located thereabove, with an intermediate or neutral zone located at such axis of the beater or scutching wheel. It is therefore evident that the straw or hank is scutched both from above and from below, while the provision of the neutral zone, permits the hank to change its position so as to be acted upon in the opposite directions from that occurring during the first scutching action of the beater or scutching wheel.

The hank of straw or fiber is clamped to the scutching chain while being presented to the beaters or scutching wheels and to this end two clamping bars 70 and 71 are provided, both depending in the same vertical plane and into the path of movement of the scutcher chain, Figs. 13, 15 and 16. These clamping bars are arranged to enter between the opposite sets of links or side plates forming part of the chain and to crimp the fiber therein and thereby hold the same from displacement while being acted upon by the beaters or scutching wheels. Each clamping bar is similarly supported, the same being held downwardly with a yielding pressure, in the present instance by springs 72 bearing at their lower ends against the heads of bolts 73, which are secured to the clamping bars and at their upper ends against the angle plates 74, secured to the main frame 1. To adjust the tension of these springs, these angle plates are provided with adjusting screws 75. By these means, the normal position of the clamping bars with respect to the scutcher chain is adjusted and the degree of tension imparted is regulated. The forward end of each of the clamping bars is upturned, the same being shoe-shaped, in order that the fiber which is being conveyed by the scutching chain will enter below the clamping bars and be clamped thereby to the chain.

In order that an unbroken surface may be presented to the fiber as it is pressed or crimped into the depressions between the side plates of the scutching chain, which surface is not found in the chain itself owing to the spaces between the links, I arrange within such depressions a long strip 76 which, in the present instance is square in cross section and fits within but does not entirely fill the depression, that is, it does not rise to the height of the side plates comprising a part of the links of the chain, as clearly shown in Figs. 15 and 16. This strip or square bar is stationary, the same being secured at its forward end to a fixed part of the machine, as seen in Fig. 10 and extending upwardly and thence horizontally to the delivery end of the scutching chain. The chain itself, as to its upper reach travels between said strip or bar 76 and a track 77 on the machine frame, Figs. 13 and 14. As illustrated, the rearward or delivery end of this stationary bar 76 is beveled so as to coöperate with the correspondingly beveled end of the stripping bar 78, (Fig. 18) which inclines upwardly and supports an apron 79, Fig. 4. As the fiber being conveyed rearwardly by the scutching chain runs off from the stationary bar 76 it runs up upon the stripping bar 78, which elevates the same and removes it from the scutching chain, thereby bringing the same into the range of delivery mechanism. This mechanism, in the present instance, comprises an endless conveyer or belt 80 running at its forward end over a pulley 81 and at its rearward end over the driving pulley 82. The lower reach of this belt is arranged in close proximity to the apron 79 and is adapted to engage the fiber which is stripped from the scutcher chain by the stripping bar and to convey the same rearwardly and deliver it therefrom. In the present instance this delivery conveyer or belt is driven by the same connections that serve to drive the scutching chain.

Any suitable driving mechanism may be employed for operating the scutching wheels, but in the present instance I employ the same general driving connections for this purpose as are employed for driving the scutching chain and the delivery conveyer, which driving connections will now be described: A cross shaft 83 is journaled in the main frame toward the rearward end of the machine and provided on one end with a pulley 84 which is driven through the medium of a belt 85 and a pulley 86 mounted on the same power shaft 30ᵃ as the main driving pulley 30 (Figs. 2, 3 and 4). This cross shaft is provided on its other end with a sprocket wheel 87, adapted to drive by means of a sprocket chain 88, a sprocket wheel 89 mounted on a shaft 90. This shaft 90 is adjustable vertically in any suitable manner, as by journaling the same in adjustable bearing boxes 90ᵃ, Fig. 2, and the same is provided with a pinion 91 which meshes with a gear wheel 14ᵃ mounted on the shaft 14 that drives the scutcher chain. This shaft is made vertically adjustable for the purpose of permitting different sizes of gear wheels or pinions to be used to obtain different speeds of the scutcher chain to thereby vary the duration of the action of the beaters upon the straw.

Referring next to the driving connections for the delivery conveyer, a sprocket wheel 92 is secured to the shaft 90 and adapted to drive the large sprocket wheel 93 through the medium of a chain 94. This wheel 93 is mounted on the same shaft 95 on which the pulley 82 is mounted and consequently the delivery conveyer or belt which runs over said pulley is operated by the rotation of the shaft 90. Now referring to the driving connections for the scutching wheels, the cross shaft 83 is provided with similar sprocket wheels 96, which serve to drive the sprocket wheels 56, before referred to, by means of the sprocket chains 97.

The fiber or straw after being presented to and acted upon by the forward beater or scutching wheel, must be moved or shifted laterally, that is to the right when the machine is viewed from the front or feed end, in order that the fiber or hank shall subsequently be gripped or clamped at one point and that the point or portion theretofore clamped and only partially acted upon by the beater shall be acted upon by the second or rearward beater while the right hand end of the fiber or hank is being beaten or scutched, with the result that the entire length of the fiber or hank is acted upon. In order to accomplish this result, the two clamping bars are separated a distance from each other so as to provide a gap or an interval of travel sufficient for the purpose of shifting the fiber endwise, toward the right hand side of the machine, Fig. 4. The first clamping bar 70 therefore ends at or near the outward limit of movement of the forward beater arms and the upper section 49 of the scutching board for such beater is cut away at its rearward side at an angle extending upwardly and rearwardly in order to permit of sufficient space for the fiber or hank to expand and release itself from the space between the links of the scutcher chain, into which it has been crimped by the clamping bar. The straw is now presented to an obliquely trending conveying mechanism, which, as shown in detail in Figs. 4, 19 and 20, consists of an endless chain 98, preferably having projecting teeth to engage the fiber, and positioned oblique with reference to the scutching chain which runs substantially centrally and longitudinally of the machine. This oblique conveyer being arranged on a plane above the scutching chain will now receive the fiber and gripping it between itself and a platform 99, will shift the same laterally a distance corresponding to the degree of obliquity of the chain. After traveling the distance of the gap between the clamping bars, the fiber is again delivered to the conveying action of the scutching chain and is also delivered in position to be acted upon by the second clamping bar 71, whereby the straw is clamped to the scutching chain for action by the rearward beater or scutching wheel where the same scutching action takes place with respect to the right hand end or section of the straw as takes place with respect to the left hand end thereof when presented to the forward scutching wheel. By preference this platform 99 is provided with a diagonal rib 100 which is straddled by the links of the obliquely trending chain to more effectually engage the straw or fiber. Describing the driving connections for this oblique conveyer, the chain 98 passes over pulleys 101 and 102, the latter of which is the driving pulley, Figs. 2, 4, and 19. This driving pulley is provided with a shaft 103 which is connected by means of a universal joint 104 to a short driving shaft 105. This latter shaft is driven in suitable manner in unison with the scutcher chain and as shown in Fig. 4, said shaft 105 is provided at its outer end with a sprocket wheel 106, which is driven through the medium of the sprocket chain 107 by means of a sprocket wheel 108 secured to the same driving shaft 14 that serves to drive the scutching chain. As shown in Fig. 2, the rear end of the sprocket chain 107 extends around a tightener sprocket wheel 109, and the lower reach of such chain extends over the top of the sprocket wheel 108 so as to give the oblique conveyer chain 98 the proper direction of rotation. The wheel 109 is mounted on the side of an adjustable hand lever 110, which is pivoted at its lower end to the main frame and adapted to be held in adjusted position by a bolt 111 passing through a slot in a plate 112. It will be understood that as illustrated in Fig. 2, this particular conveyer is arranged at or slightly above the horizontal plane of the scutching chain, which is the preferable construction, inasmuch as any tow or the like from the fiber is not liable to clog or interfere with the movements of the conveyer, inasmuch as the same would tend to drop by gravity through the machine and consequently away from such conveyer. In order to provide for adjustment of the degree of obliquity of the conveyer 98, the bearings for the sprockets 101 and 102 are mounted upon a frame 113, which is adapted to swing from a point 114 adjacent the bearing of the sprocket 101 as a center. By means of the block 115 depending from the lower side of the swinging frame and the coöperating adjusting screw 116 and its hand wheel 117, any desired degree of obliquity may be secured and maintained for the oblique conveyer and consequently any desired amount of lateral shifting of the straw may be provided for.

Describing the operation of the machine by following the course of the material from its entrance as straw into the machine to its delivery as fiber therefrom, the straw (either threshed or unthreshed) is placed upon the feed table 118 at the front end of the machine (Figs. 1 and 3) and is fed by the operator to the conveyer or feed chains in a layer or body and as uniformly as possible. The straw is now conveyed by the chains with an intermittent or step-by-step movement upon the grid, the operation of the parts being so timed that the forward movement for advancement of the straw takes place when the breaking blades are in their elevated position hereinbefore referred to. These blades are now lowered to operating position and after their fulcrum has been brought to lowermost position (in which it is locked by the cam slots) the blades are then depressed and forcibly thrust downwardly between the grid bars in the peculiar manner hereinbefore explained, that is, the middle pair of blades is operated first and the others in rapid succession outwardly to opposite sides, according to the timing of the eccentrics as illustrated in Fig. 3. As each blade strikes, the straw is forced and crimped between the adjacent grid bars and the wood and pith thereof is broken, crushed and loosened from the fiber. This operation continues as the straw is carried across the grid so that every stalk receives a great number of blows repeatedly and successively delivered upon each portion of its length. The peculiar progressive action or imparting of blows upon the straw in successive order from the center outwardly in opposite directions results in a much improved quality of the product inasmuch as such method of delivering the blows permits of the required slack as the crimping action proceeds; that is to say, when each blade strikes, the straw is drawn or moved inwardly to provide for the crimping, which it produces by forcing it between the grid bars and as the ends of the straw are always free and the last to be acted upon, this inward movement of the straw from opposite ends is possible, with the result that the fiber is not subjected to any strain tending to break or tear it, but is left wholly intact while the wood and pith are effectually broken and more or less detached from the fiber.

Although so far as the other features of my machine are concerned the breaking mechanism may be made other than as herein shown, yet the grid form is preferred inasmuch as it permits the wood or pith which have become detached to fall clear through the grid, thereby quickly disposing of the same and preventing it from following the straw in its further travel, even as far as the rearward end of the grid.

As hereinbefore stated, the grid frame is mounted to rock and is also adjustable. This adjustment is provided in order that the proper working relationship between the grid and breaking blades may be obtained and the rocking thereof is provided particularly to relieve the machine of excessive strain in the breaking operation. As a result of this rocking arrangement, the rear end of the grid which is in its upper position during the breaking operation, that is when the fulcrum shaft is down and held down thereby forcing the front end of the grid down, will be lowered when the breaking blades are raised and the break chains move with the result that with the same degree of rise of the lifting device at the front end of the machine a greater size of throat is provided at the rear end of the grid and an unimpeded passage provided for the fiber, thereby permitting free movement of such fiber and relieving the machine of strain. Describing the coöperation between this rocking grid and the breaking blades, when the links which raise and lower the fulcrum shaft depress the latter which in turn presses down upon the front end of the grid, the grid being pivoted, and pivoted a little in advance of the center, is overbalanced with the result that such lowering of the front end of the grid causes a greater raising of the rear end and when the links rise, the rear end of the grid immediately drops, so that the grid works like a lower jaw. In addition to the advantages already named, it is possible to obtain a much deeper mesh of the breaking blades and the grid without greater strain on the machine. It will be understood that the slots 6$^a$ are a trifle wider than the diameter of the guiding shafts 5 and that such slots are long enough to permit of the described rocking movements. The cross-pieces 1$^a$ act as bumpers to stop and limit the amount of rocking of the grid. The body of straw after being thus broken is fed step by step by the break chains after passing the throat formed at the rearward end of the blades, as explained, and is then conveyed rearwardly of the grid and delivered to the scutcher chain which now engages the straw and conveys it to the scutching devices. As soon as, in its travel, the first clamping bar 70 is reached, the straw becomes clamped toward its middle portion to the scutcher chain and while so clamped is presented to and acted upon by the forward scutching wheel. The wood and pith which has been broken and loosened but not removed in the breaking operation is now scutched by the arms of this beater, it being understood that, at this time, only the left hand end portion of the fiber or hank is operated upon. As the straw approaches the scutching wheel the beating arms beat down upon the fiber, but after the center of the wheel is passed they beat up upon it, the wheels revolving in the direction indicated in the drawings by the arrows. Thus both sides of the straw are beaten without any reversal of position of the hank, as is customary in hand scutching. When the gap between the clamping bars is reached, the fiber is shifted, the same trending laterally to the right when viewed from the front end of the machine, so that the second clamping bar, to which the straw or hank is now presented in its further travel, will engage the hank on one side of its middle portion and on the scutched side, thereby presenting to the second or rearward scutching wheel the other or unscutched portion of the hank, as well as the middle portion which had been theretofore clamped by the bar 70. The same scutching action now takes place as before and the cleaned hank, which is now in fact fiber, is conveyed to the delivery conveyer at the rear end of the machine and by it passed out therefrom in the manner already clearly explained. As stated, the scutcher chain is operated continuously, which is preferable to intermittent action, inasmuch as the continuous movement of this chain keeps the straw distributed uniformly throughout the machine, particularly as it takes the same from the break chains, thereby preventing the straw from becoming bunched together. As a result, the beaters are enabled to act upon the straw with increased effect.

I claim:

1. In a machine of the class described, means for breaking the straw comprising a breaking surface, a series of blades adapted to coöperate with such surface and to strike the straw transversely, means for raising and lowering said series of blades after each operation of the complete series away from and toward an operative position with respect to said surface, and means for driving said blades successively against such surface after being so moved to operative position.

2. In a machine of the class described, means for breaking the straw comprising a breaking surface, a series of blades adapted to coöperate with such surface and to strike the straw transversely, means for raising and lowering said series of blades after each operation of the series away from and toward an operative position with respect to said surface, and means for swinging the blades.

3. In a machine of the class described, means for breaking the straw comprising a breaking surface, a series of blades adapted to coöperate with such surface and to strike the straw transversely, means for raising and lowering said series of blades after each operation of the series away from and toward an operative position with respect to said surface, and means for swinging the blades successively.

4. In a machine of the class described, the means for breaking the straw comprising a breaking surface, a plurality of blades adapted to coöperate with such surface and to strike the straw transversely, means connected with one end of said blades for raising and lowering them toward and away from an operative position with respect to said surface, and means connected with the other end thereof for depressing or driving said blades successively against such surface after being so moved to operative position.

5. In a machine of the class described, the means for breaking the straw comprising a breaking surface, a plurality of blades adapted to coöperate with such surface and to strike the straw transversely, conveying mechanism for conveying the straw forwardly across said surface with an intermittent movement, means for driving said blades against said surface, and means for lowering such blades to an operative position with respect to such surface preliminary to the said driving operation and for raising such blades during the forward movement of the straw.

6. In a machine of the class described, means for breaking the straw comprising a breaking surface, a series of blades adapted to coöperate with such surface and to strike the straw transversely, said blades being pivoted at one end, means for raising the blades at the pivoted end, and means for swinging them about the pivot.

7. In a machine of the class described, means for breaking the straw comprising a breaking surface, a series of blades adapted to coöperate with such surface and to strike the straw transversely, said blades being pivoted at one end, means for raising the blades at the pivoted end, and means for separately and consecutively swinging the blades to deliver blows upon the straw.

8. In a machine of the class described, the means for breaking the straw comprising a breaking surface, a plurality of blades fulcrumed at one end and adapted to coöperate with such surface and to strike the straw transversely, means for raising and lowering the fulcrum of said blades toward and away from an operative position, and a raising and lowering device coöperating with the other end of said blades for depressing the same and thereby driving them against the breaking surface to break or crackle the straw.

9. In a machine of the class described, the means for breaking the straw comprising a breaking surface, a plurality of blades fulcrumed at one end and adapted to coöperate with such surface and to strike the straw transversely, means for raising and lowering the fulcrum of said blades, and means connected with the other end of said blades for depressing and driving them successively against the breaking surface to break or crackle the straw.

10. In a machine of the class described, the means for breaking the straw comprising a breaking surface, a plurality of blades fulcrumed at one end and adapted to coöperate with such surface and to strike the straw transversely, means for raising and lowering the fulcrum of said blades, and means connected with the other end of said blades for depressing and driving them against the breaking surface in successive order beginning at the center and extending outwardly in opposite directions.

11. In a machine of the class described, the means for breaking the straw comprising a breaking surface, a plurality of blades adapted to coöperate with such surface and to strike the straw transversely, a rod arranged at one end of said blades and acting as a fulcrum therefor, means for raising and lowering said fulcrum, and means coöperating with the other end of said blades for depressing them toward the breaking surface to break the straw.

12. In a machine of the class described, the means for breaking the straw comprising a breaking surface, a plurality of blades adapted to coöperate with such surface and to strike the straw transversely, means coöperating with the front ends of said blades for raising and lowering them thereat and for locking them in working position, and means coöperating with the other ends of said blades for depressing them against the breaking surface.

13. In a machine of the class described, the means for breaking the straw comprising a breaking surface, a plurality of blades adapted to coöperate with such surface and to strike the straw transversely, and separate means coöperating with the ends of said blades for depressing them unequal amounts, one end being lowered or depressed to a working position and the other end being further lowered and driven against the breaking surface to break the straw.

14. In a machine of the class described, the means for breaking the straw comprising a breaking surface, a plurality of blades adapted to coöperate with such surface and to strike the straw transversely, a rod or shaft arranged at one end of said blades and acting as a fulcrum therefor, mechanism for intermittently raising and lowering said rod, and means coöperating with the other end of said blades for depressing them toward the breaking surface.

15. In a machine of the class described, the means for breaking the straw comprising a breaking surface, a plurality of blades adapted to coöperate with such surface and to strike the straw transversely, a rod arranged at one end of said blades and acting as a fulcrum therefor, cam mechanism coöperating with said rod for raising and lowering the same together with the blades, and means coöperating with the other end of said blades for depressing them toward the breaking surface.

16. In a machine of the class described, the means for breaking the straw comprising a breaking surface, a plurality of blades adapted to coöperate with such surface and to strike the straw transversely, a rod or shaft arranged at one end of said blades and acting as a fulcrum therefor, cam mechanism for raising and lowering said rod consisting of a pair of plates having cam slots receiving the ends of said shaft, and means for oscillating said plates, and means coöperating with the other end of said blades for depressing them toward the breaking surface.

17. In a machine of the class described, the means for braking the straw comprising a breaking surface, a plurality of blades adapted to coöperate with such surface and to strike the straw transversely, a rod or shaft arranged at one end of said blades and acting as a fulcrum therefor, cam mechanism for raising and lowering said rod consisting of a pair of plates having cam slots receiving the ends of said shaft, said slots having an angular and a concentric portion, in the latter one of which the shaft is held stationary and in lowered position while the blades are driven against the breaking surface, means for oscillating said plates and means coöperating with the other end of said blades for depressing them toward the breaking surface.

18. In a machine of the class described, means for breaking the straw comprising a breaking surface, a series of blades adapted to coöperate with such surface and to strike the straw transversely, means for raising and lowering one end of said series of blades before each operation of the series, and a series of eccentrics connected with the other end of said blades to depress them successively against the breaking surface.

19. In a machine of the class described, the means for breaking the straw comprising a breaking surface, a plurality of blades adapted to coöperate with such surface and to strike the straw transversely, means for raising and lowering one end of said blades before each operation of the series of blades, a series of eccentric straps connected to the other end of said blades, and differently timed eccentrics for such straps.

20. In a machine of the class described, the means for breaking the straw comprising a breaking surface, a plurality of blades adapted to coöperate with such surface and to strike the straw transversely, means for raising and lowering one end of said blades, a series of eccentric straps connected to the other end of said blades in pairs, one strap to two blades, and differently timed eccentrics for such straps.

21. In a machine of the class described, the means for breaking the straw comprising a grid consisting of a series of parallel bars, a plurality of blades arranged above the grid in alinement with the spaces between said bars, means for raising and lowering said blades before each operation of the series of blades toward and away from an operative position with respect to said surface, and means for driving said blades successively between said bars after being so moved to operative position.

22. In a machine of the class described, the means for breaking the straw comprising a breaking surface, a plurality of blades adapted to coöperate with such surface and to strike the straw transversely, means for raising and lowering said blades toward and away from an operative position with respect to said surface, means for driving said blades successively against such surface, and means for advancing the straw across the breaking surface during the interval when the blades are raised.

23. In a machine of the class described, the means for breaking the straw comprising a breaking surface, a plurality of blades adapted to coöperate with such surface and to strike the straw transversely, means for raising and lowering said blades toward and away from an operative position with respect to said surface, means for driving said blades successively against such surface, and conveyer mechanism intermittently operated and adapted to convey the straw across the breaking surface during the interval when the blades are raised.

24. In a machine of the class described, the means for breaking the straw comprising a breaking surface, a plurality of blades adapted to coöperate with such surface and to strike the straw transversely, means for raising and lowering said blades toward and away from an operative position with respect to said surface, means for driving said blades successively against such surface, and a series of chains for conveying the straw across the breaking surface and sunk therein so as to form a part thereof in the operation of the blades.

25. In a machine of the class described, the means for breaking the straw comprising a breaking surface, a plurality of blades adapted to coöperate with such surface and to strike the straw transversely, means for raising and lowering said blades toward and away from an operative position with respect to said surface, means for driving said blades successively against such surface after being so moved to operative position, and a series of break chains provided with teeth for engaging and conveying the straw across the breaking surface, said chains being sunk in the breaking surface to form a part thereof in the operation of the blades, the upper face of said breaking surface being substantially flush except for said projecting teeth.

26. In a machine of the class described, the combination of a series of breaking blades, and a pivoted breaking surface with which said blades coöperate, said surface being adjustable with respect to the blades.

27. In a machine of the class described, the combination, with the main frame, of a series of breaking blades, and a pivoted breaking surface with which said blades coöperate, said surface being mounted and adjustable vertically upon said frame.

28. In a machine of the class described, the combination, with a main frame, of a series of breaking blades, a pivoted breaking surface with which said blades coöperate, said breaking surface comprising a frame and a series of parallel bars forming a grid, and means for adjusting the height of the breaking surface with respect to the breaking blades.

29. In a machine of the class described, the combination of a series of breaking blades, and a breaking surface with which said blades coöperate and which is adapted to rock.

30. In a machine of the class described, the combination of a series of breaking blades, a breaking surface comprising a series of bars with which said blades coöperate, and a rocking frame in which said bars are located.

31. In a machine of the class described, the combination of a series of breaking blades, and a breaking surface coöperating with the breaking blades, such surface being pivoted at one side of its center and arranged to rock in the operation of the blades.

32. In a machine of the class described, the combination of a series of breaking blades, a pivoted breaking surface coöperating with the breaking blades, and means for limiting the rocking movements of the breaking surface.

33. In a machine of the class described, the combination of a series of breaking blades, a pivoted breaking surface coöperating with the breaking blades, and stops arranged at the opposite ends of the breaking surface to limit the rocking movements thereof.

34. In a machine of the class described, the combination of a series of breaking blades, and a breaking surface coöperating with the breaking blades, said surface being pivoted at one side of its center and toward the front end of the machine.

35. In a machine of the class described, the combination of a series of breaking blades, a breaking surface coöperating with the breaking blades and comprising a grid frame and a series of parallel bars therein forming the grid proper, and a cross shaft on which the grid frame is pivoted and which is located in advance of the center of such frame.

36. In a machine of the class described, the combination, with a main frame, of a series of breaking blades, a breaking device comprising a breaking surface proper and a frame therefor, a shaft on which such latter frame is mounted to rock, and means for raising and lowering such shaft to adjust the position of the breaking surface relative to the breaking blades.

37. In a machine of the class described, the combination, with a main frame, of a series of breaking blades, a breaking device comprising a breaking surface proper and a frame therefor, a shaft on which such latter frame is mounted to rock, means for raising and lowering such shaft to adjust the position of the breaking surface relative to the breaking blades, and means for guiding the frame of the breaking device in its movements.

38. In a machine of the class described, the combination with a main frame of a series of breaking blades, a breaking device comprising a breaking surface proper and a frame therefor, a shaft on which said latter frame is mounted to rock, supporting plates pivoted on said main frame and connected with said shaft, and means whereby said plates may be oscillated to raise and lower the frame of the breaking device.

39. In a machine of the class described, the combination, with a main frame, of a series of breaking blades, a breaking device comprising a breaking surface proper and a frame therefor, a shaft on which such latter frame is mounted to rock, supporting plates pivoted on said main frame and connected with said shaft, and cams coöperating with the plates to hold them in different angular positions.

40. In a machine of the class described the combination of a series of tooth conveyer chains, an additional conveyer chain beyond and extending in the same direction, the upper or conveying run of which is substantially in the plane of the conveying run of the series, between members of which series it is interspaced and which series it overlaps, and inclined fingers, the lower ends arranged to extend between the chains of the series and below the material thereon and to raise the material above the plane of the teeth thereof into position to be received by the additional chain.

41. In a machine of the class described, the combination, with a scutching device, of a conveyer chain for conveying the straw in position to be acted upon by the scutching device, said chain comprising a series of links with central longitudinal depressions, a stationary bar positioned in said depressions on the driving portion or reach of the chain, and means for clamping the straw upon the chain and against said bar.

42. In a machine of the class described, the combination, with a scutching device, of a conveyer chain for conveying the straw in position to be acted upon by the scutching device, said chain comprising a series of links with central depressions, a stationary bar in said depressions on the driving portion or reach of the chain, means for clamping the straw upon the chain and against said bar, and a stripping bar arranged at the delivery end of the chain and coöperating with said stationary bar to remove the straw from the chain.

43. In a machine of the class described, the combination, with a scutching device, of a conveyer chain for conveying the straw in position to be acted upon by the scutching device, said chain comprising a series of links with central depressions, a stationary bar in said depressions on the driving portion or reach of the chain, means for clamping the straw upon the chain and against said bar, and a stripping bar arranged at the delivery end of the chain and coöperating with said stationary bar to remove the straw from the chain, said stripping bar being inclined and fitting against the delivery end of the stationary bar to form a combination thereof.

44. In a machine of the class described, the combination, with a scutching device, of a conveyer chain for conveying the straw in position to be acted upon by the scutching device, said chain comprising a series of links with central depressions, a stationary bar in said depressions on the driving portion or reach of the chain, means for clamping the straw upon the chain and against said bar, a stripping bar arranged at the delivery end of the chain and coöperating with said stationary bar to remove the fiber from the chain, and an endless conveyer arranged adjacent said stripping bar for receiving the fiber and delivering it from the machine.

45. In a machine of the class described, the combination, with a scutching device, of a conveyer chain for conveying the straw in position to be acted upon by the scutching device, said chain comprising a series of links with central depressions, a stationary bar in said depressions on the driving portion or reach of the chain, means for clamping the straw upon the chain and against said bar, a stripping bar arranged at the delivery end of the chain and coöperating with said stationary bar to remove the fiber from the chain, an apron connected with the stripping bar, and an endless conveyer arranged above the apron for engaging the fiber and delivering it from the machine.

46. In a machine of the class described, the combination, with a scutching device, of a conveyer chain for conveying the straw in position to be acted upon by the scutching device, said chain comprising a series of links with central depressions, a stationary bar in said depressions on the driving portion or reach of the chain, means for clamping the straw upon the chain and against said bar, the delivery end of said stationary bar being beveled, and a stripping bar having one end similarly beveled and fitting under said delivery end of the stationary bar to form a continuation thereof.

47. In a machine of the class described, the combination, with the scutching wheel, of a scutching board in two parts separated by a slot corresponding to the path of the fiber, one of said parts being yieldingly supported.

48. In a machine of the class described, the combination, with the scutching wheel, of a scutching board in two parts separated by a slot corresponding to the path of the hank, the upper one of said parts being yieldingly held in a normal position.

49. In a machine of the class described, the combination, with the scutching wheel, of a scutching board in two parts separated by a slot corresponding to the path of the hank, the upper one of said parts being adjustable in position vertically and being yieldingly held in a normal position.

50. In a machine of the class described, the combination, with the frame of the machine, of a scutching wheel, a scutching board in two parts separated by a slot corresponding to the path of the hank of straw or fiber, and a bracket connected to one of the parts of the board and having a yielding connection with the machine frame.

51. In a machine of the class described, the combination, with the frame of the machine, of a scutching wheel, a scutching board in two parts separated by a slot corresponding to the path of the hank of straw or fiber, supporting rods passing loosely through said machine frame, and springs coöperating with said rods for holding them and the board in normal position.

52. In a machine of the class described, the combination of a scutching board, a scutching wheel, a driving shaft for said wheel, a driving wheel splined on said shaft, means for holding the driving wheel in a fixed position relative to the longitudinal axis of the shaft, a collar on the free end of said shaft, a block engaging said collar, and means for shifting said block along the longitudinal axis of the shaft to thereby adjust the scutching wheel toward and away from the board.

53. In a machine of the class described, the combination of a scutching board, a scutching wheel, a driving shaft for said wheel, a driving wheel splined on said shaft, means for holding the driving wheel in a fixed position relative to the longitudinal axis of the shaft, a collar on the free end of said shaft, a block engaging said collar, and an adjustable screw engaging said block for shifting it in the longitudinal axis of the shaft to thereby adjust the scutching wheel toward and away from the board.

54. In a machine of the class described, the combination with a main frame, of a scutching board, a scutching wheel coöperating with the board, and means for yieldingly pressing the wheel toward the board.

55. In a machine of the class described, a scutching board, a scutching wheel, and a spring for forcing the wheel toward the board.

56. In a machine of the class described, the combination with a main frame, of a scutching board, a scutching device comprising a wheel coöperating with the board, a shaft for said wheel, and means for holding said shaft and wheel pressed toward the board with a yielding pressure.

57. In a machine of the class described, the combination with a main frame, of a scutching board, a scutching device comprising a wheel coöperating with the board, a shaft for said wheel, and springs exerting their tension against the shaft and wheel to hold them toward the board with a yielding pressure.

58. In a machine of the class described, the combination of a scutching board having a horizontal slot through which the hank of straw or fiber passes, a scutching wheel, and a stationary shield interposed between the board and the central portion of the wheel and providing a space between itself and the board for the hank to prevent the latter from twisting during its passing through the neutral zone of the wheel.

59. In a machine of the class described, the combination of a scutching board having a horizontal slot through which the hank of straw or fiber passes, a scutching wheel, and a shield secured to the board and extending vertically parallel therewith on the wheel side thereof to provide a restricted space for the hank and thereby prevent twisting thereof during its passage through the neutral zone.

60. In a machine of the class described, the combination of a scutching board, a scutching wheel comprising a central drum portion, a series of beater arms thereon, a shield covering said drum or the scutching board end thereof, and a second but stationary shield interposed between the board and drum portion of the wheel, forming a space through which the hank passes while out of the range of the beater arms.

61. In a machine of the class described, the combination with the beaters or scutching wheels and with the main conveyer for conveying and presenting the straw thereto, of a conveyer trending obliquely with respect to said main conveyer and adapted to shift the straw lengthwise, said oblique conveyer being adjustable with respect to its degree of obliquity.

62. In a machine of the class described, the combination with the beaters or scutching wheels and with the main conveyers for conveying and presenting the straw thereto, of a conveyer trending obliquely with respect to said main conveyer and adapted to shift the straw lengthwise, and an adjustable frame in which said oblique conveyer is mounted.

63. In a machine of the class described, the combination with the beaters or scutching wheels and with the main conveyer for conveying and presenting the straw thereto, of a conveyer trending obliquely with respect to said main conveyer and adapted to shift the straw lengthwise, an adjustable frame in which said oblique conveyer is mounted, and means for securing said frame in adjusted position.

BERTRAND S. SUMMERS.

Witnesses:
W. G. BRYANT,
THOMAS J. WHITE.